US012281930B2

United States Patent
Oda

(10) Patent No.: US 12,281,930 B2
(45) Date of Patent: Apr. 22, 2025

(54) WINDSHIELD FOR BALANCE

(71) Applicant: A&D COMPANY, LIMITED, Tokyo (JP)

(72) Inventor: Hisanori Oda, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 408 days.

(21) Appl. No.: 17/798,257

(22) PCT Filed: Mar. 17, 2020

(86) PCT No.: PCT/JP2020/011698
§ 371 (c)(1),
(2) Date: Aug. 8, 2022

(87) PCT Pub. No.: WO2021/186544
PCT Pub. Date: Sep. 23, 2021

(65) Prior Publication Data
US 2023/0075383 A1    Mar. 9, 2023

(51) Int. Cl.
*G01G 21/28* (2006.01)
(52) U.S. Cl.
CPC .................. *G01G 21/286* (2013.01)
(58) Field of Classification Search
CPC .............. G01G 21/286; G01G 21/30
(Continued)

(56) References Cited

U.S. PATENT DOCUMENTS

| 4,700,793 A | 10/1987 | Lüchinger | |
| 8,067,705 B2 * | 11/2011 | Izumo | G01G 21/30 |
| | | | 49/404 |

(Continued)

FOREIGN PATENT DOCUMENTS

| CN | 204007846 U | 12/2014 |
| JP | 2003-262549 A | 9/2003 |

(Continued)

OTHER PUBLICATIONS

International Search Report and Written Opinion issued in the corresponding Application No. PCT/JP2020/011698 issued on May 26, 2020; 3 pages.

(Continued)

*Primary Examiner* — Jacques M Saint Surin
(74) *Attorney, Agent, or Firm* — Studebaker Brackett PLLC

(57) ABSTRACT

Provided is a windshield for a balance, for which opening and closing doors of the windshield are smoothly moved without wobbling, dust or the like is unlikely to accumulate on the part of guide rails that guide the opening and closing doors, and cleaning is easy. Upper portions of the pair of opening and closing doors of the windshield are respectively suspended by upper frames provided along respective side portions of an upper surface door, and the opening and closing doors are reciprocated by air cylinders by being guided by guide rails each formed of a horizontal portion and a vertical portion. On the respective horizontal portions, projections that restrict lower ends of the respective opening and closing doors from being displaced in separating directions from the vertical portions are provided along movement paths of the respective opening and closing doors.

6 Claims, 6 Drawing Sheets

(58) Field of Classification Search
USPC .......................................................... 177/180
See application file for complete search history.

(56) References Cited

U.S. PATENT DOCUMENTS

| | | | | |
|---|---|---|---|---|
| 8,198,553 | B2 * | 6/2012 | Durst | G01G 21/286 |
| | | | | 70/79 |
| 8,484,895 | B2 * | 7/2013 | Kuhnmuench | E05D 15/48 |
| | | | | 49/164 |
| 9,523,603 | B2 * | 12/2016 | Feldotte | G01G 21/283 |
| 11,175,176 | B2 * | 11/2021 | Oda | G01G 23/00 |
| 11,460,339 | B2 * | 10/2022 | Oda | E05F 15/56 |
| 11,473,966 | B2 * | 10/2022 | Oda | G01G 21/286 |
| 12,140,471 | B2 * | 11/2024 | Oda | G01G 21/30 |
| 2003/0221874 | A1 | 12/2003 | Eisinger et al. | |
| 2007/0012488 | A1 | 1/2007 | Olesen et al. | |
| 2010/0095598 | A1 | 4/2010 | Izumo et al. | |
| 2010/0288566 | A1 | 11/2010 | Lüchinger et al. | |
| 2016/0265963 | A1 | 9/2016 | Kuhlmann et al. | |
| 2016/0265964 | A1 | 9/2016 | Kuhlmann et al. | |

FOREIGN PATENT DOCUMENTS

| | | | |
|---|---|---|---|
| JP | 5368364 B | 12/2013 | |
| WO | WO-2021186544 A1 * | 9/2021 | ........... G01G 21/286 |

OTHER PUBLICATIONS

Reply to International Search Report and Written Opinion under PCT Article 34 filed in the corresponding Application No. PCT/JP2020/011698 on Jul. 9, 2021; 6 pages.

International Preliminary Report on Patentability issued in the corresponding Application No. PCT/JP2020/011698 on Sep. 30, 2021; 8 pages.

* cited by examiner

Fig. 6

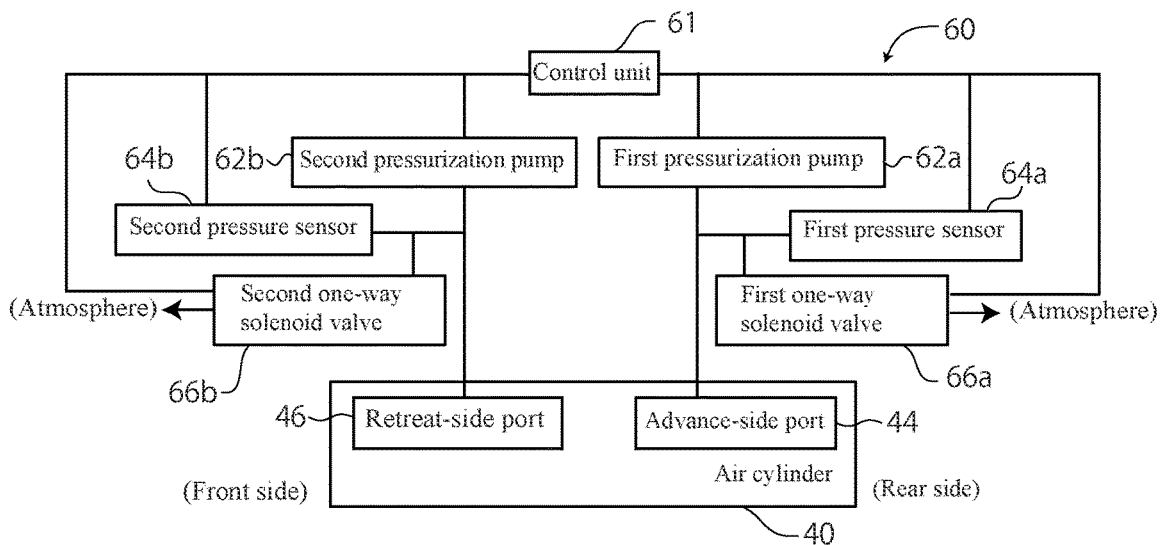

Fig. 7

|  | Opening/closing door 11 | | | |
|---|---|---|---|---|
|  | Automatic opening operation (move rearward) | Automatic closing operation (move forward) | Standard state (manually openable and closable) | During calibration |
| First one-way solenoid valve 66a | Open | Close | Open | Close |
| First pressurization pump 62a | Not operate | Pressurize | Not operate | Not operate |
| Second one-way solenoid valve 66b | Close | Open | Open | Close |
| Second pressurization pump 62b | Pressurize | Not operate | Not operate | Not operate |

WINDSHIELD FOR BALANCE

TECHNICAL FIELD

The present invention relates to a windshield for a balance, a pair of suspended side surface portions of which serve as opening and closing doors, the opening and closing doors to be opened and closed by a driving means.

BACKGROUND ART

Conventionally, a balance using a windshield for which an opening and closing door to be automatically opened and closed by a driving means is suspended at an upper end portion is known, and a lower end portion as a free end of the opening and closing door is generally guided by a groove provided in a guide rail. However, while a specimen is placed on a weighing pan inside a weighing chamber surrounded by the windshield, the specimen is sometimes spilled on the inside of the weighing chamber or the guide rail, and when cleaning this, it is difficult to completely clean out the specimen that has fallen into the groove of the guide rail. Further, in the groove, dust is also likely to accumulate naturally, and it is also difficult to completely clean out such dust. Such a specimen or dust remaining in the groove poses a problem in which it will obstruct smooth opening and closing operations of the opening and closing door.

To eliminate this problem, conventionally, a configuration is provided such that, without providing the guide rail, a floor portion of the weighing chamber is formed into a truncated pyramid shape and inclined so as to become lower toward a peripheral edge, and the peripheral edge is brought into contact with a lower inner side surface of the opening and closing door to guide movements of the opening and closing door (Patent Literature 1), and a configuration is proposed in which movements of the opening and closing door are guided by a guide rail formed of a stepped portion having an L-shaped cross-section without a groove portion (Patent Literature 2).

CITATION LIST

Patent Literature

[Patent Literature 1] Japanese Patent Publication No. 5368364
[Patent Literature 2] Japanese Utility Model Publication No. H03-11711

SUMMARY OF INVENTION

Technical Problem

In Patent Literature 1, a pair of horizontally slidable side wall portions (opening and closing doors) are held at vertical positions, and are pushed by a biasing torque, lower inner side surfaces of the side wall portions facing boundary end portions as peripheral edges of the floor surface always face and are in contact with the boundary end portions, and define a weighing chamber as a closed space. In this way, the side wall portions need to be always in close contact with the boundary end portions by a biasing torque in order to define the closed space, which poses a problem in which friction is great to make smooth sliding of the pair of side wall portions (opening and closing doors) difficult, and for sliding the side wall portions, a great driving force is needed.

On the other hand, in Patent Literature 2, in a case of opening or closing the pair of sliding windows (opening and closing doors) together, locks of grips at lower sides, respectively fixed to both sides of a plate provided movably on a bottom portion of the weighing chamber, are inserted into and integrated with lower ends of bars respectively fixed to the sliding windows, so that lower portions of the respective sliding windows do not wobble. However, when it is desired to move the respective sliding windows separately, the locks of the lower-side grips inserted into the lower ends of the bars are detached and released from being integrated with each other, so that there is a problem that lower ends of the respective sliding windows are guided in contact with bottom surface portions of the guide rails, but they become free in thickness directions of the lower ends, so that during movement, the lower portions of the respective sliding windows wobble in the thickness directions to impair sealability of the weighing chamber. To prevent this wobbling, when the bottom surface portions and the lower ends of the sliding windows are brought into firm contact with each other, a problem occurs in that friction becomes greater to make a smooth movement of the respective sliding windows difficult.

An object of the present invention is to provide a windshield for a balance, including opening and closing doors from which the problems described above have been eliminated.

Solution to Problem

In order to solve the problems described above, a windshield for a balance according to the present invention is a windshield covering a weighing pan to define a weighing chamber, and the windshield has a front surface portion, a pair of side surface portions, a back surface portion, and an upper surface portion, the pair of side surface portions are respectively opening and closing doors for opening and closing side surfaces of the weighing chamber, upper portions of said opening and closing doors being supported movably by holding portions provided along respective side portions of the upper surface portion, and lower portions being guided by guide rails each formed of a horizontal portion and a vertical portion, configured to be reciprocated by a driving means, and on the horizontal portions of the respective guide rails, restricting members configured to restrict lower ends of the respective opening and closing doors from being displaced in separating directions from the vertical portions of the respective guide rails are provided along movement paths of the respective opening and closing doors.

As described above, each guide rail is formed of a horizontal portion and a vertical portion, and has no groove, so that dust does not accumulate in the guide rail, and even if dust or a specimen adheres to the guide rail, it can be easily cleaned out and thus be easily cleaned, so that smooth movements of the respective opening and closing doors are not obstructed by dust and a specimen. In addition, the restricting members configured to restrict the lower ends of the respective opening and closing doors from being displaced in separating directions from the vertical portions of the respective guide rails are provided, so that lower portions of the respective opening and closing doors do not wobble.

Moreover, by a configuration in which lower ends of the respective opening and closing doors are positioned at distances from the horizontal portions of the guide rails and positioned at a height not higher than upper ends of the vertical portions, while outside air is reliably prevented from flowing into the weighing chamber, and even if a specimen or dust remains on the horizontal portions, it does not obstruct reciprocating motions of the opening and closing doors, and the respective opening and closing doors are smoothly reciprocated.

Further, the driving means is configured by air cylinders provided outside the weighing chamber for each of the respective opening and closing doors, each of the air cylinders is joined, at a tip end of a piston rod capable of projecting out and retreating, to an end portion at the front surface portion sides of the opening and closing door, and the restricting member is provided so as to be positioned closer to the back surface portion than the portion joined to the opening and closing door, that is, positioned at the opposite side to the front surface portion, in a state where the piston rod of the air cylinder is retreating most, and accordingly, smooth movements of the opening and closing door by the driving means and restriction by the restricting member in the entire range of the movements are reliably secured. Moreover, because lower portions of the opening and closing doors do not wobble, excessive loads are also not applied when the driving means operates.

Furthermore, by configuring the restricting member by one projection, friction between the projection serving as the restricting member and the opening and closing door becomes smaller, and the movements of the opening and closing door become smoother.

Advantageous Effects of Invention

According to the present invention, in a windshield defining a weighing chamber, opening and closing doors that open and close side surfaces of the weighing chamber are guided by guide rails without grooves, and lower portions of the opening and closing doors are prevented from wobbling, so that not only does cleaning become easy, but the inside of the weighing chamber can be reliably shut off from the outside, and excessive unnecessary loads are not applied to the driving means, and the opening and closing doors can be smoothly reciprocated.

BRIEF DESCRIPTION OF DRAWINGS

FIG. 6 is a block diagram illustrating a driving system of an opening and closing mechanism of the opening and closing door.

FIG. 7 is an operation chart of the opening and closing mechanism of the opening and closing door.

DESCRIPTION OF EMBODIMENTS

Hereinafter, a preferred embodiment of the present invention will be described based on the attached drawings.

Figure 1:
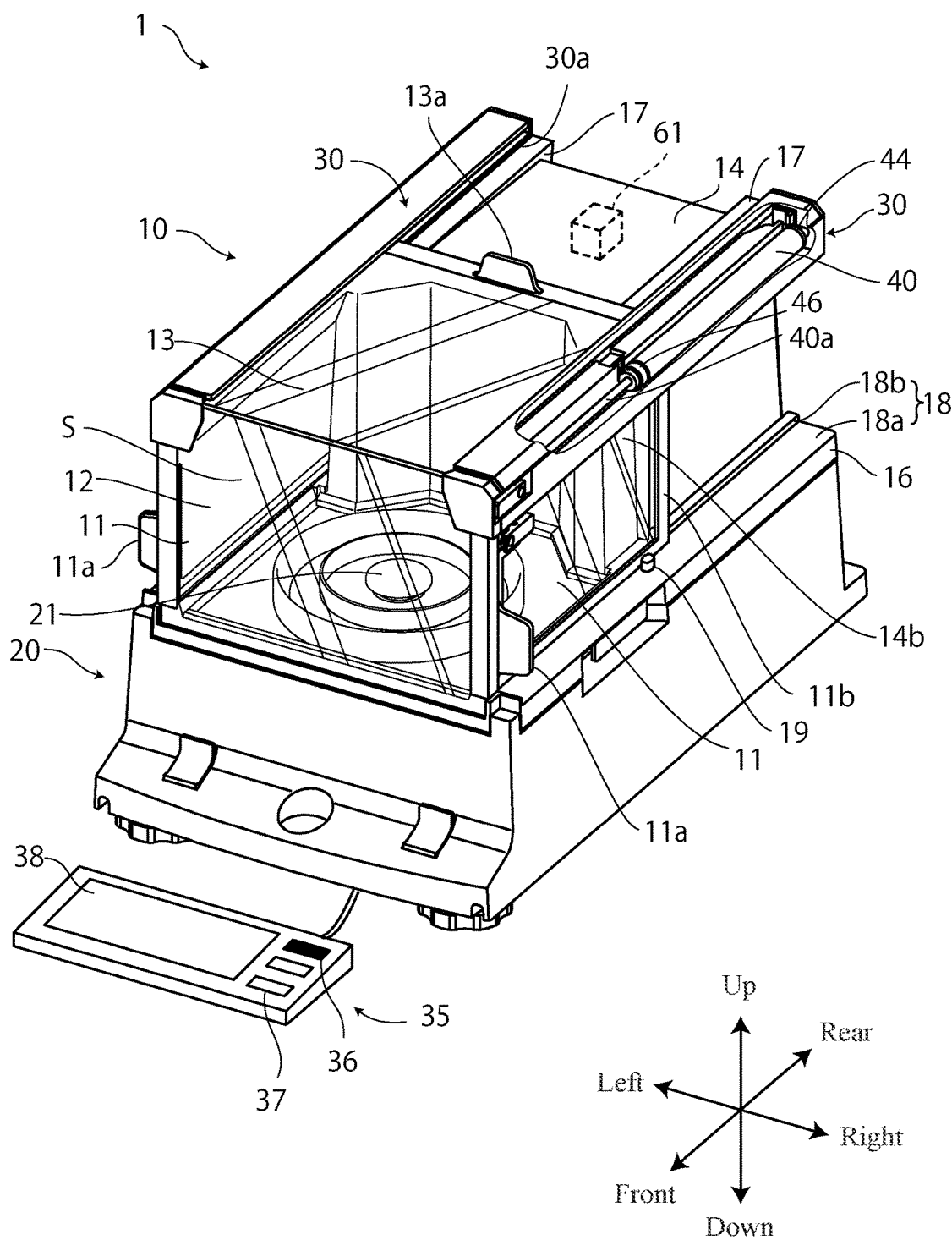
FIG. 1 is a perspective view of a balance, illustrating a first embodiment.

As illustrated in FIG. 1, a balance 1 includes an electronic balance 20 and a windshield 10. The electronic balance 20 includes a weighing pan 21 for placing a specimen on its upper surface. The windshield 10 may be detachably attached to the electronic balance 20 by a publicly known attaching and detaching mechanism, or may be integrated with the electronic balance 20 in a non-separable manner. The windshield 10 is installed on an upper surface of the electronic balance 20 so as to surround a periphery of the weighing pan 21, and prevents air flows around the weighing pan 21, for example, wind from an air conditioner, breath of a person at the time of weighing, air flow generated when a person walks, etc., from acting as a wind pressure on a load-applied portion centered on the weighing pan 21 and influencing weighing.

The windshield 10 has a bottomless box shape, and has a front glass 12 as a front surface portion, opening and closing doors 11 and 11 as a pair of side surface portions, a box-shaped case 14 as a back surface portion, and an upper surface door 13 as an upper surface portion, and covers the weighing pan 21 by the front glass 12, the pair of opening and closing doors 11 and 11, a front surface wall 14b of the case 14, and the upper surface door 13 to define a weighing chamber S having a substantially rectangular parallelepiped shape. The front glass 12, the pair of opening and closing doors 11 and 11, and the upper surface door 13 are made of a transparent glass or resin material so that an internal state can be observed. However, the windshield 10 may be configured to have a shape other than a bottomless box shape.

The opening and closing doors 11 and 11 are suspended by being supported at their upper portions slidably by upper frames 17 and 17 as holding portions provided along respective side portions of the upper surface door 13 and cylinder boxes 30 and 30. The opening and closing doors 11 and 11 are reciprocated, with their lower portions moving along guide rails 18 and 18 each formed of a horizontal portion 18a and a vertical portion 18b provided in a lower frame 16 serving as a frame member of a lower portion of the windshield 10, by air cylinders 40 (only one air cylinder is illustrated) disposed inside the cylinder boxes 30 and 30.

Further, the upper surface door 13 is movable forward and rearward along guide grooves 30a (refer to FIG. 4) provided in the cylinder boxes 30 and 30 located at left and right sides of an upper portion of the windshield 10.

To the opening and closing doors 11 and 11 and the upper surface door 13, handles 11a, 11a, and 13a are respectively attached so that the doors are manually moved. The opening and closing doors 11 and 11 can be driven not only manually but also automatically by the air cylinders 40.

Moreover, a control panel 35 is for operating the balance 20 and the opening and closing doors 11 and 11 of the windshield 10, and provided separately from the balance 20 and the windshield 10. The separate provision is for preventing vibrations by operations such as pushing a switch from influencing weighing. Because the control panel 35 is a separate body, a user can freely dispose the control panel 35 at a position easy to operate. However, it does not necessarily have to be configured separately. The control panel 35 includes a wired communication function for signal transmission and reception, but may be configured so as to transmit and receive information by wireless communications.

The control panel 35 includes, on its upper surface, a display unit 38 to display weighing results and states, a switch 37 for operation, and an infrared sensor 36. The infrared sensor 36 is a switch for opening and closing the opening and closing doors 11 and 11, and just by holding a hand over this sensor, the opening and closing doors 11 and 11 can be automatically opened and closed. A push switch may be provided in place of the infrared sensor 36, or a configuration in which both of the push switch and the infrared sensor 36 are provided is also possible. The infrared sensor 36 may be provided with a balance operating function other than the function for opening and closing the opening and closing doors 11 and 11. A configuration is also possible in which two left and right infrared sensors 36 are respectively provided so that each sensor opens and closes a corresponding opening and closing door 11, 11.

The air cylinder 40 is a double-acting type, and both of forward and backward strokes of reciprocating motion of a piston inside the air cylinder 40 are made by air pressure, so that ports to feed air to the inside of the air cylinder 40 are provided at two positions. At the front side of the air cylinder 40, a retreat-side port 46 for making the piston move rearward by fed air is provided, and at the rear side, an advance-side port 44 for making the piston 41 move forward is provided (refer to FIG. 6). To these ports 44 and 46, air tubes not illustrated are connected, and linked to pressurization pumps 62a and 62b inside the case 14 (refer to FIG. 6).

Inside the case 14, the pressurization pumps 62a and 62b serving as drive sources of the air cylinder 40 and solenoid valves 66a and 66b to control air flowing and stoppage, and a control unit 61 to control these, etc., are stored (refer to FIG. 6).

Here, the pair of opening and closing doors 11 and 11 and their opening and closing mechanisms will be described in detail, but since the opening and closing doors 11 and 11 have the same structure, description will be given of only one opening and closing door 11.

Figure 4:
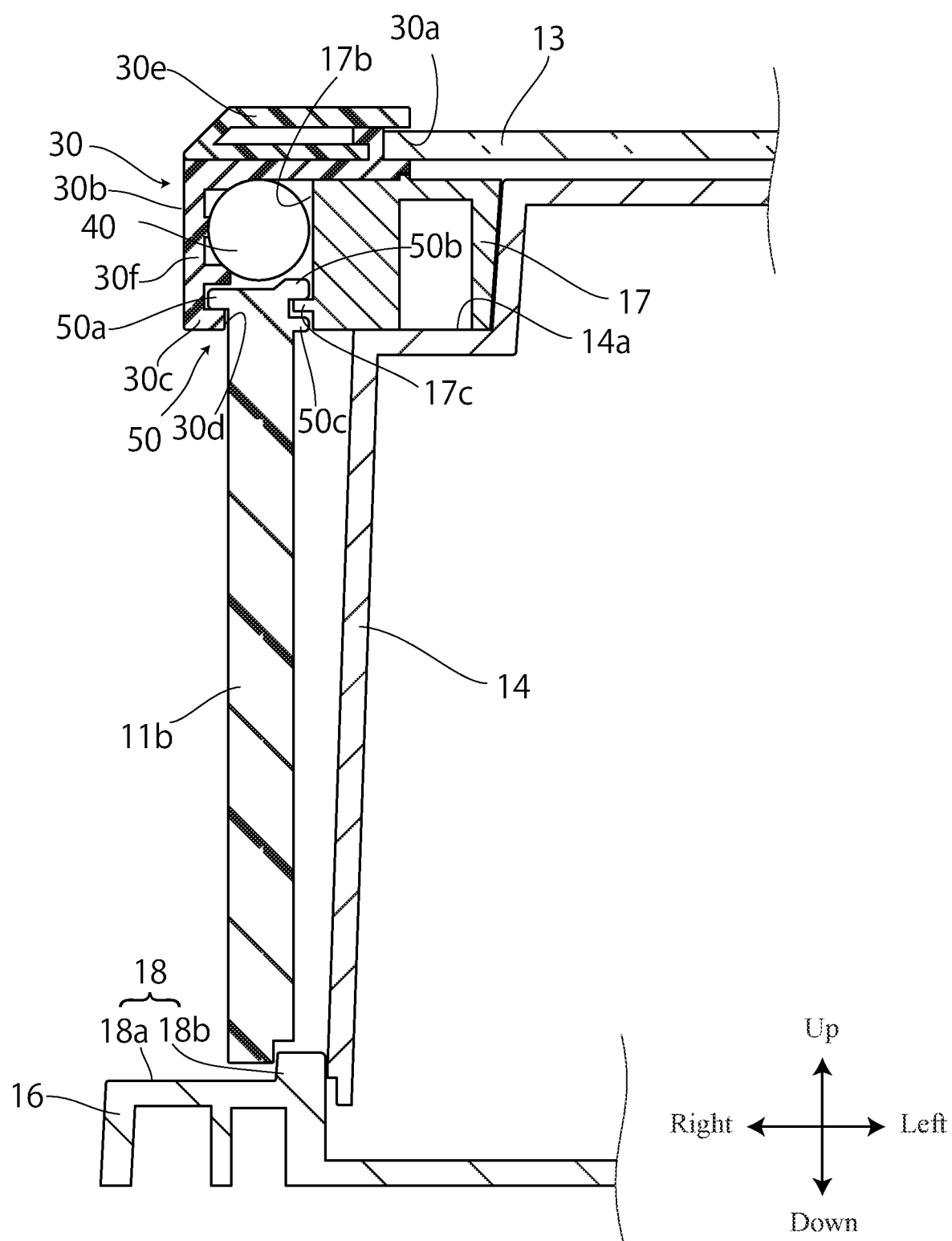
FIG. 4 is an end view illustrating a portion taken along line X-X in FIG. 2.

As illustrated in FIG. 4, the cylinder box 30 is formed of a cylinder storage portion 30f and a cover 30e, and in an inner wall of the cylinder storage portion 30f, a recess is formed to match the shape of the air cylinder 40, and the air cylinder 40 is fitted and fixed into this recess. A gap between an upper plate portion of the cover 30e and an upper plate portion of the cylinder storage portion 30f defines a guide groove 30a into which a side edge of the upper surface door 13 projects.

Figure 5:
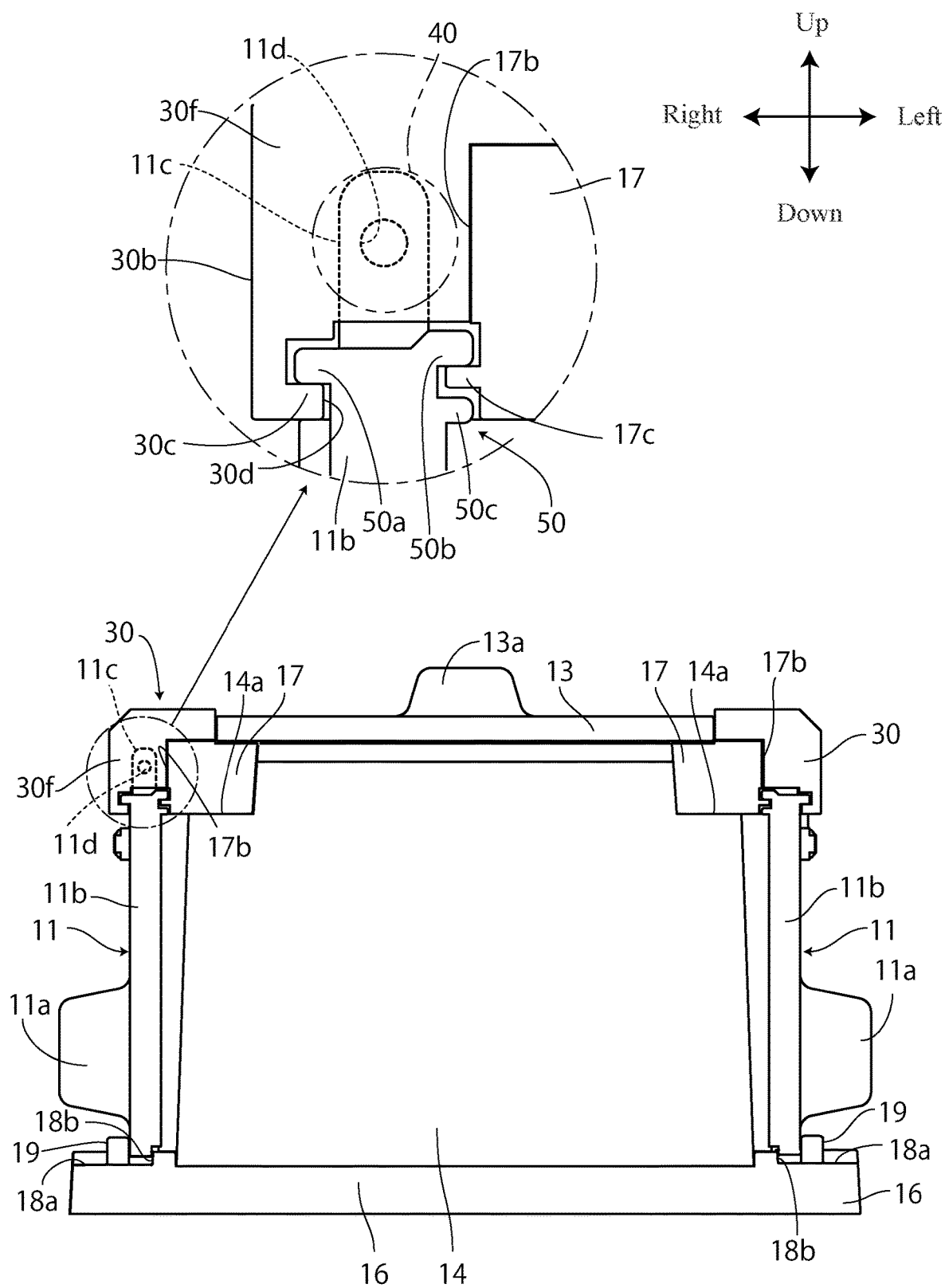
FIG. 5 is a back view of the windshield.

As illustrated in FIGS. 4 and 5, the pair of upper frames 17 are disposed along concave portions 14a provided at left and right edge portions of an upper portion of the case 14, and constitute frame members of the upper portion of the windshield 10. The cylinder storage portion 30f of the cylinder box 30 is configured so that the upper plate portion is placed on an upper surface of the upper frame 17, and as illustrated in FIG. 5, a back surface-side end portion is formed into an inverted L shape and its inner side surface comes into contact with a side surface 17b of the upper frame 17, and a right-angle portion of the inverted L shape is engaged with a corner portion of the upper frame 17, and the cylinder storage portion 30f is fixed to the upper frame 17.

The cylinder storage portion 30f does not have a bottom surface (refer to FIG. 4), and an upper portion of an outer frame 11b of the opening and closing door 11 is disposed to enter the inside of the cylinder storage portion 30f. At a lower end portion of an outer side surface 30b of the cylinder storage portion 30f, an inner flange 30c folded inward is formed over the entire length in a longitudinal direction. In addition, at a lower portion of the outer side surface 17b of the upper frame 17, a projecting portion 17c positioned above the inner flange 30c and extending over the entire length in the longitudinal direction (front-rear direction) is formed. An upper surface of the inner flange 30c and a lower surface of the projecting portion 17c are positioned at substantially the same height.

At front and rear end portions of the upper portion of the outer frame 11b of the opening and closing door 11, engagement portions 50 orthogonal to the sliding direction of the opening and closing door 11 (the front-rear direction in FIGS. 2 and 3) and projecting in a thickness direction of the opening and closing door 11 (the left-right direction in FIGS. 4 and 5) are formed. The engagement portion 50 is formed to be supported by respective upper surfaces of the inner flange 30c and the projecting portion 17c, and is formed of a first engagement portion 50a formed to project toward the inner flange 30c side, a second engagement portion 50b formed to project toward the projecting portion 17c side, and further, a third engagement portion 50c formed at a distance below the second engagement portion 50b. The third engagement portion 50c and the second engagement portion 50b are positioned so as to sandwich the projecting portion 17c, and the third engagement portion 50c is positioned corresponding to a guide hole 30d formed of a slit between the inner flange 30c and a portion below the projecting portion 17c, and is positioned at a distance from a lower surface of the projecting portion 17c.

In this way, the opening and closing door 11 is suspended by being supported at its upper portion slidably by the upper frame 17 serving as a holding portion and the cylinder box 30. A lower end of the opening and closing door 11 is disposed at a distance from the surface of the horizontal portion 18a of the guide rail 18 formed on the lower frame 16, and the upper portion of the opening and closing door 11 is slidable by being guided by the guide hole 30d.

In the present embodiment, the suspending mode of the opening and closing door 11 is configured as described above, however, other conventionally known configurations such as a mode in which the engagement portion 50 is formed into a T shape and engaged in a slit formed in a flat plate or a mode in which the engagement portion 50 is formed into a hook shape and engaged with a projecting rail may also be used.

Figure 2:
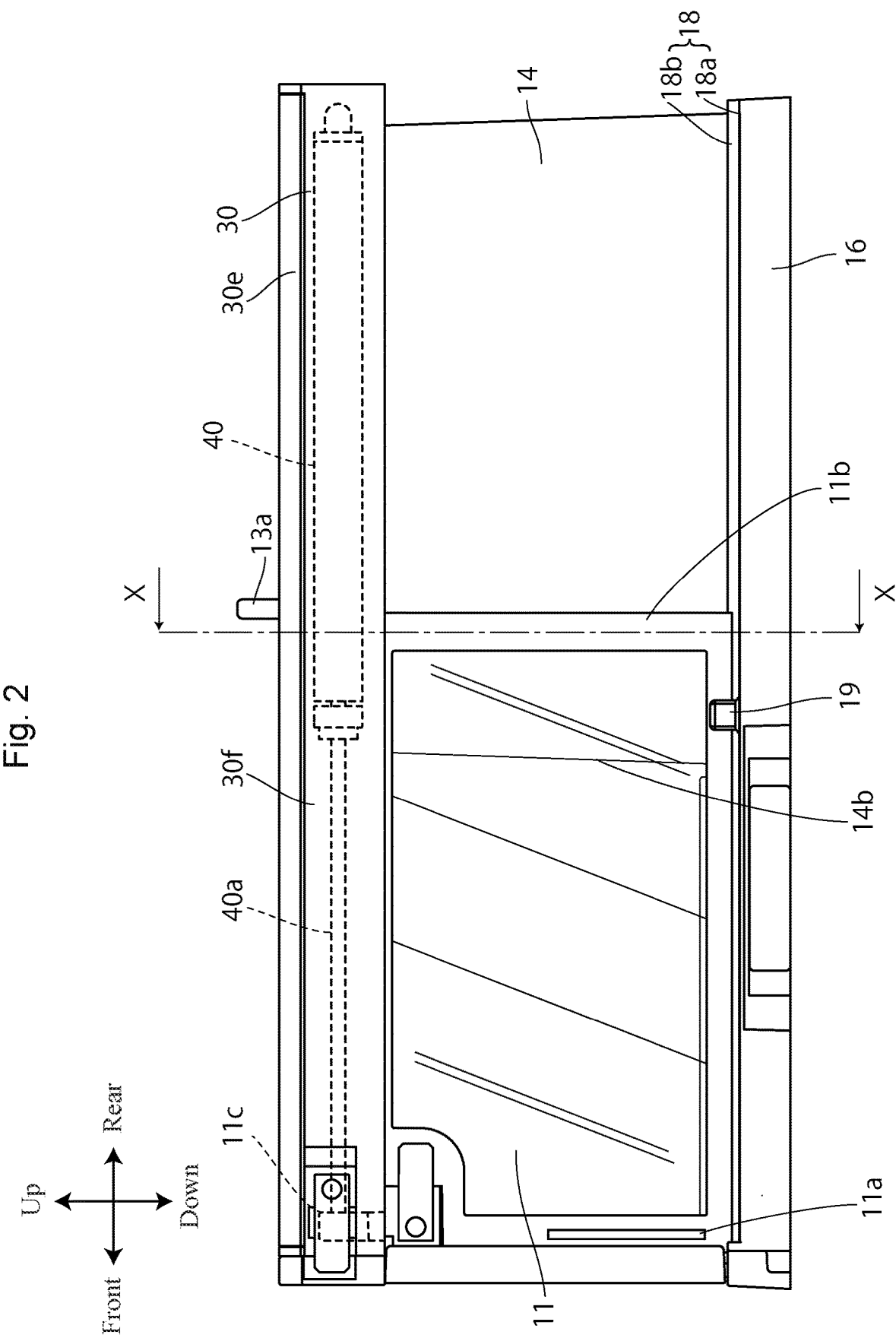
FIG. 2 is a right side view of a windshield, illustrating a closed state of an opening and closing door.
Figure 3:
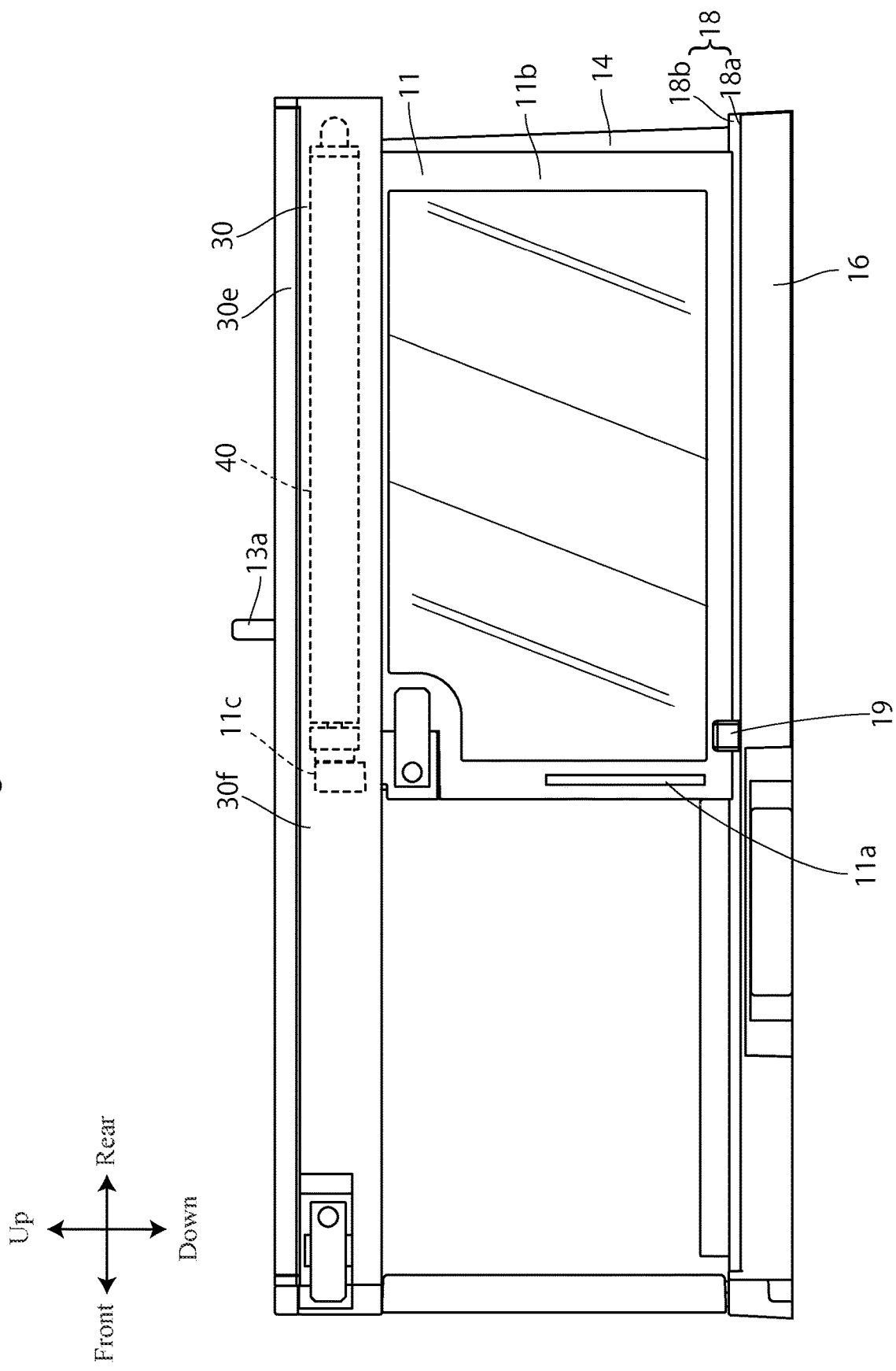
FIG. 3 is a right side view of the windshield, illustrating an opened state of the opening and closing door.

As illustrated in FIGS. 2, 3, and 5, on a front end upper surface of the outer frame 11b of the opening and closing door 11, a block-shaped coupling portion 11c is provided, and in the coupling portion 11c, a coupling hole 11d extending in a moving direction of the opening and closing door 11 is formed. A tip end of a piston rod 40a extending from the piston inside the air cylinder 40 is fitted and fixed into this coupling hole 11d. The piston rod 40a is connected to the outer frame 11b of the opening and closing door 11 and the piston rod 40a is moved forward or rearward by air, so that the outer frame 11b slides along the guide hole 30d, and the opening and closing door 11 is opened or closed.

In addition, as illustrated in FIGS. 4 and 5, respective lower end surfaces of the outer frames 11b of the respective opening and closing doors 11 are positioned at distances from the horizontal portions 18a of the guide rails 18, and are positioned at a height not higher than upper ends of the vertical portions 18b. Therefore, while outside air is reliably prevented from flowing into the weighing chamber S, even if a specimen or dust remains on the horizontal portions 18a, it does not obstruct reciprocating motions of the opening and closing doors 11, and the respective opening and closing doors 11 are smoothly reciprocated.

The air cylinder 40 is fixed at a distance from the outer frame 11b so as not to come into contact with the upper surface of the outer frame 11b even in the state where the outer frame 11b is engaged with the inner flange 30c (refer to FIG. 4), and the air cylinder 40 does not obstruct movements of the opening and closing door 11. The coupling portion 11c projects higher than the upper surface of the outer frame 11b, however, the coupling portion 11c is fixed to the tip end of the piston rod 40a, and therefore does not enter below the air cylinder 40, and a movement path of the coupling portion 11c is secured inside the cylinder box 30, so that the cylinder box 30 and the coupling portion 11c do not interfere with each other.

The air cylinder 40 serving as a driving means of the opening and closing door 11 is disposed substantially right above the opening and closing door 11 and parallel to the moving direction of the opening and closing door 11. The outer frame 11b of the opening and closing door 11 is joined to the air cylinder 40 by the coupling portion 11c formed on the upper surface, and the air cylinder 40 directly slides the outer frame 11b to move the opening and closing door 11. Therefore, force transmissibility from the air cylinder 40 is high, and the opening and closing door 11 can be smoothly opened and closed with a small force.

As illustrated in FIGS. 1 to 3 and 5, on the horizontal portion 18a of each guide rail 18, a projection 19 serving as a restricting member to restrict the lower end of each opening and closing door 11 from being displaced in a separating direction from the vertical portion 18b of each guide rail 18 is provided along the movement path of each opening and closing door 11. This projection 19 has an octagonal prism shape although not clearly illustrated in the drawings. The projection 19 is provided so as to be positioned closer to the back surface than the portion joined to the opening and closing door 11, that is, the coupling portion 11c in a state where the piston rod 40a of the air cylinder 40 retreats most. By this projection 19, the lower portion of the opening and closing door 11 is prevented from wobbling, and smooth movements of the opening and closing door 11 are secured. The wobbling prevention is reliably secured in the entire range of movements of the opening and closing door 11.

Moreover, the guide rail 18 is formed of the horizontal portion 18a and the vertical portion 18b, and has no groove, so that dust does not accumulate there, and even if dust or a specimen adheres to the guide rail, it can be easily cleaned out, and the projection 19 does not serve as an obstruction for this cleaning out.

Subsequently, a driving system of an automatic opening and closing mechanism of the opening and closing door 11 will be described with reference to FIG. 6. An opening and closing mechanism 60 is a mechanism for opening and closing the opening and closing door 11, and each of the left and right opening and closing doors 11 includes the opening and closing mechanism 60, and is controlled independently by a connected opening and closing mechanism 60. Each opening and closing mechanism 60 is controlled by the control unit 61. In the present embodiment, a pump (first pressurization pump 62a) to move the piston and the piston rod 40a of the air cylinder 40 forward (projects out from the air cylinder 40) and a pump (second pressurization pump 62b) to move the piston and the piston rod rearward (retreats into the air cylinder 40) exist separately. FIG. 6 illustrates only one opening and closing mechanism 60, and the other opening and closing mechanism 60 also has the same configuration.

The opening and closing mechanism 60 includes the first pressurization pump 62a, the second pressurization pump 62b, a first pressure sensor 64a, a second pressure sensor 64b, the first one-way solenoid valve 66a, the second one-way solenoid valve 66b, the air cylinder 40, and the control unit 61. The air cylinder 40 is joined to the coupling portion 11c of the opening and closing door 11 through the piston rod 40a.

Both of the first pressurization pump 62a and the second pressurization pump 62b are air pumps. Each pressurization pump 62a, 62b is a drive source of the air cylinder 40, and compresses and feeds air to the air cylinder 40, and projects or retreats the piston and the piston rod 40a by an air pressure to move the opening and closing door 11.

Outlet sides of the first one-way solenoid valve 66a and the second one-way solenoid valve 66b are open to the atmosphere, and air flowing and stoppage are controlled by opening and closing of the valves.

The first pressure sensor 64a monitors a pressure of air discharged from the first pressurization pump 62a, and the second pressure sensor 64b monitors a pressure of air discharged from the second pressurization pump 62b. The two pressure sensors 64a and 64b are respectively connected to the ports 44 and 46 of the air cylinder 40, and monitor a pressure of air to be supplied to the air cylinder 40 and a pressure of air inside the air cylinder 40.

To the advance-side port 44 provided at the rear side of the air cylinder 40, the first pressurization pump 62a is connected. The air supply path has a branch halfway, and the first pressure sensor 64a and the first one-way solenoid valve 66a are further connected. To the retreat-side port 46 provided at the front side of the air cylinder 40, the second pressurization pump 62b is connected. The air supply path has a branch halfway, and the second pressure sensor 64b and the second one-way solenoid valve 66b are connected to this branch.

The respective components of the opening and closing mechanism 60 are disposed inside the case 14, and their operations are controlled by the control unit 61.

Next, operations of the respective components when automatically opening and closing the opening and closing door 11 will be described based on FIG. 7, but since operations of the respective opening and closing doors 11 are the same, description will be given of only one opening and closing door 11.

First, in a "standard state" where a user can manually open and close the opening and closing door 11, neither of the first pressurization pump 62a and the second pressurization pump 62b operates, and the first one-way solenoid valve 66a and the second one-way solenoid valve 66b are open. Because neither of the pressurization pumps 62a and 62b operates, and both one-way solenoid valves 66a and 66b are opened and communicate with the atmosphere, no load is applied from the air cylinder 40, and the opening and closing door 11 can be smoothly manually opened and closed.

When a command to "open/close the opening and closing door" is input from the infrared sensor 36 on the control panel 35, the control unit 61 commands the respective components to operate.

In a case of an "automatic opening operation" to open the opening and closing door 11, that is, when the piston rod 40a of the air cylinder 40 is moved rearward, namely, retreated, the second one-way solenoid valve 66b is closed, and pressurization of the second pressurization pump 62b is started. At this time, the first pressurization pump 62a does not operate, and the first one-way solenoid valve 66a is open, so that the piston rod 40a is retreated by an air pressure, and the opening and closing door 11 is opened (the state illustrated in FIG. 3).

When the opening and closing door 11 is fully opened, the air pressure rapidly increases. When this pressure change is detected by the second pressure sensor 64b, pressurization of the second pressurization pump 62b is stopped, the second one-way solenoid valve 66b is opened, and compressed air inside the air cylinder 40 is released to the atmosphere, and the mechanism returns to the standard state.

In a case of an "automatic closing operation" to close the opening and closing door 11, that is, when the piston rod 40*a* inside the air cylinder 40 is moved forward, namely, projected out, the first one-way solenoid valve 66*a* is closed, and pressurization of the first pressurization pump 62*a* is started. At this time, the second pressurization pump 62*b* does not operate, and the second one-way solenoid valve 66*b* is open, so that the piston rod 40*a* is projected out (moved forward) by an air pressure, and the opening and closing door 11 is closed (the state illustrated in FIG. 2).

When the opening and closing door 11 is fully closed, the air pressure rapidly increases again. When this pressure change is detected by the first pressure sensor 64*a*, pressurization of the first pressurization pump 62*a* is stopped, the first one-way solenoid valve 66*a* is opened, and compressed air inside the air cylinder 40 is released to the atmosphere, and the mechanism returns to the standard state.

On the other hand, when calibration of the balance is performed, both of the first one-way solenoid valve 66*a* and the second one-way solenoid valve 66*b* are closed. Both one-way solenoid valves 66*a* and 66*b* are closed, the piston rod 40*a* of the air cylinder 40 can neither project out nor retreat (can move neither forward nor rearward), and the opening and closing door 11 is locked. This is for preventing the opening and closing door 11 from being unexpectedly opened or closed during calibration work and influencing the calibration. After the calibration is finished, the first one-way solenoid valve 66*a* and the second one-way solenoid valve 66*b* are opened, and the mechanism returns to the standard state.

In this way, the opening and closing door 11 is automatically locked during calibration work. A configuration in which the opening and closing door 11 is locked in response to a command from the switch 37 is also possible. Not only during calibration but also during transportation of the balance 1, by closing both one-way solenoid valves 66*a* and 66*b*, the opening and closing door 11 can be locked.

As described above, when one pressurization pump operates, the other pressurization pump does not operate, and only one solenoid valve is closed, and the other solenoid valve is opened and communicates with the atmosphere. When the pump that has been operating stops, the closed solenoid valve opens and communicates with the atmosphere. In other words, the configuration is made so that when the pressurization pumps stop, both one-way solenoid valves are opened and communicate with the atmosphere. After the opening and closing door 11 is automatically opened or closed, air is released to the atmosphere, the load applied to the opening and closing door 11 is eliminated, and it becomes possible to smoothly manually move the opening and closing door 11. While the opening and closing door 11 is automatically openable and closable, after it is automatically opened or closed, manual opening/closing becomes possible immediately without any special operation.

The present invention is not limited to the embodiment described above, and for example, the projection 19 may be formed into, besides the octagonal prism shape, other polygonal prism shapes or columnar shapes. The restricting member may be, besides the projection 19, a flat plate or pipe material extending short parallel to the vertical portion 18*b*.

REFERENCE SIGNS LIST

1 Balance
10 Windshield
11 Opening and closing door
11*b* Outer frame
11*c* Coupling portion
11*d* Coupling hole
12 Front glass
13 Upper surface door
14 Case
17 Upper frame
18 Guide rail
18*a* Horizontal portion
18*b* Vertical portion
19 Projection
20 Electronic balance
30 Cylinder box
40 Air cylinder
40*a* Piston rod
50 Engagement portion
S Weighing chamber

The invention claimed is:

1. A windshield for a balance, covering a weighing pan to define a weighing chamber, wherein
    the windshield has a front surface portion, a pair of side surface portions, a back surface portion, and an upper surface portion,
    the pair of side surface portions are respectively opening and closing doors for opening and closing side surfaces of the weighing chamber, upper portions of said opening and closing doors being supported movably by holding portions provided along respective side portions of the upper surface portion, and lower portions being guided by guide rails each formed of a horizontal portion and a vertical portion, configured to be reciprocated by a driving means,
    on the horizontal portions of the respective guide rails, restricting members configured to restrict lower ends of the respective opening and closing doors from being displaced in separating directions from the vertical portions of the respective guide rails are provided along movement paths of the respective opening and closing doors, and
    the lower ends of the respective opening and closing doors are positioned at distances from the horizontal portions of the guide rails, and positioned at a height not higher than upper ends of the vertical portions.

2. The windshield for a balance according to claim 1, wherein
    the driving means is configured to be air cylinders provided outside the weighing chamber for each of the respective opening and closing doors, each of the air cylinders being joined, at a tip end of a piston rod capable of projecting out and retreating, to an end portion at the front surface portion side of the opening and closing door, and
    the restricting member is provided so as to be positioned closer to the back surface portion than the portion joined to the opening and closing door in a state where the piston rod of the air cylinder is retreating most.

3. The windshield for a balance according to claim 2, wherein the restricting member is configured to be one projection.

4. The windshield for a balance according to claim 1, wherein the lower ends of the respective opening and closing doors are spaced from the vertical portions of the respective guide rails.

5. The windshield for a balance according to claim 1, wherein an overlap in a vertical direction between the lower ends of the respective opening and closing doors and the vertical portions of the respective guide rails is less than a distance in the vertical direction between lower ends of the respective opening and closing doors and the horizontal portions of the respective guide rails.

6. The windshield for a balance according to claim 1, wherein one or the other of the lower ends of the respective opening and closing doors and the respective guide rails includes a recess for receiving a corner of one or the other of the respective opening and closing doors and the respective guide rails.

* * * * *